United States Patent
Nakanishi et al.

(10) Patent No.: US 11,987,692 B2
(45) Date of Patent: May 21, 2024

(54) THERMOPLASTIC RESIN COMPOSITIONS, ADHESIVE COATING MATERIALS, AND LAMINATES USING THE SAME

(71) Applicant: RIKEN TECHNOS CORPORATION, Tokyo (JP)

(72) Inventors: Ryota Nakanishi, Tokyo (JP); Kosuke Sugiya, Tokyo (JP)

(73) Assignee: RIKEN TECHNOS CORPORATION, Tokyo-To (JP)

( * ) Notice: Subject to any disclaimer, the term of this patent is extended or adjusted under 35 U.S.C. 154(b) by 370 days.

(21) Appl. No.: 15/560,615

(22) PCT Filed: Feb. 29, 2016

(86) PCT No.: PCT/JP2016/055983
§ 371 (c)(1),
(2) Date: Sep. 22, 2017

(87) PCT Pub. No.: WO2016/152389
PCT Pub. Date: Sep. 29, 2016

(65) Prior Publication Data
US 2018/0117889 A1 May 3, 2018

(30) Foreign Application Priority Data

Mar. 25, 2015 (JP) ................. 2015-061875
Sep. 11, 2015 (JP) ................. 2015-179009
Nov. 25, 2015 (JP) ................. 2015-229333

(51) Int. Cl.
| | | |
|---|---|---|
| B32B 27/00 | (2006.01) | |
| B32B 15/085 | (2006.01) | |
| B32B 27/08 | (2006.01) | |
| C08K 5/14 | (2006.01) | |
| C08K 5/1539 | (2006.01) | |
| C08L 23/08 | (2006.01) | |
| C08L 53/02 | (2006.01) | |
| C09J 123/08 | (2006.01) | |
| C09J 145/00 | (2006.01) | |
| C09J 153/02 | (2006.01) | |

(52) U.S. Cl.
CPC ........ *C08L 23/0823* (2013.01); *B32B 15/085* (2013.01); *B32B 27/00* (2013.01); *B32B 27/08* (2013.01); *C08K 5/14* (2013.01); *C08K 5/1539* (2013.01); *C08L 53/025* (2013.01); *C09J 123/0823* (2013.01); *C09J 145/00* (2013.01); *C09J 153/02* (2013.01); *C09J 153/025* (2013.01)

(58) Field of Classification Search
CPC ..... C08K 5/14; C08K 5/1539; C08L 23/0823; C08L 53/025; C08F 287/00; C08F 222/06; C08F 255/02; C08F 8/46; C09J 123/0823; C09J 153/025; C09J 4/06; C09J 145/00; C09J 153/02; B32B 15/085; B32B 27/00; B32B 27/08; B32B 27/32
See application file for complete search history.

(56) References Cited

U.S. PATENT DOCUMENTS

| | | | |
|---|---|---|---|
| 6,730,736 B1 * | 5/2004 | Kaita | .......... C08F 8/00 525/210 |
| 2011/0073901 A1 | 3/2011 | Fujita et al. | |

FOREIGN PATENT DOCUMENTS

| | | |
|---|---|---|
| JP | 62-79252 | 4/1987 |
| JP | 11-70624 | 3/1999 |
| JP | 2001-98130 | 4/2001 |
| JP | 2003-191380 | 7/2003 |
| JP | 2003-213051 | 7/2003 |
| JP | 2005126485 | * 12/2005 |
| JP | 2007-182467 | 7/2007 |
| KR | 10-2001-0042010 | 5/2001 |
| WO | 2009/148716 | 12/2009 |

OTHER PUBLICATIONS

Machine translation of JP 2003-213051, retrieved Jun. 8, 2019.*
Machine translation of JP 2005126485 retrieved Jan. 9, 2019.*
International Preliminary Report on Patentability dated Oct. 5, 2017 in International Application No. PCT/JP2016/055983.
Extended European Search Report dated Aug. 1, 2018 in corresponding European patent application No. 16768292.1.
International Search Report dated May 17, 2016 in International Application No. PCT/JP2016/055983.
Office Action dated Oct. 5, 2022, in corresponding Korean Patent Application No. 10-2017-7027970, with Machine Translation, 10 pages.

* cited by examiner

*Primary Examiner* — Michael B Nelson
(74) *Attorney, Agent, or Firm* — Wenderoth, Lind & Ponack, L.L.P.

(57) ABSTRACT

Provided is a thermoplastic resin composition or an adhesive coating material capable of adhering a cyclic polyolefin-based polymer with a metal or metal compound such as aluminum foil or an ethylene-vinyl alcohol copolymer with sufficient strength. The thermoplastic resin composition contains (A) 100 parts by mass of thermoplastic resin; (B) 0.05 to 5 parts by mass of one or more kinds selected from the group consisting of an unsaturated carboxylic acid and an unsaturated carboxylic acid derivative; and (C) 0.01 to 3 parts by mass of organic peroxide; which component (A) contains (a1) 10 to 90% by mass cyclic polyolefin-based polymer; and (a2) 90 to 10% by mass a hydrogenated product of a block copolymer comprising a polymer block composed mainly of an aromatic vinyl compound and a random copolymer block of a conjugated diene compound and an aromatic vinyl compound (with the proviso that the total of the component (a1) and the component (a2) is 100% by mass).

16 Claims, No Drawings

THERMOPLASTIC RESIN COMPOSITIONS, ADHESIVE COATING MATERIALS, AND LAMINATES USING THE SAME

TECHNICAL FIELD

The present invention relates to thermoplastic resin compositions and adhesive coating materials. More particularly, the invention relates to thermoplastic resin compositions and adhesive coating materials comprising a cyclic polyolefin-based polymer and a hydrogenated product of a block copolymer comprising a polymer block composed mainly of an aromatic vinyl compound and a random copolymer block of an aromatic vinyl compound and a conjugated diene compound; and laminates using such a thermoplastic resin composition or such an adhesive coating material.

BACKGROUND ART

Laminates of a cyclic polyolefin-based polymer and an ethylene-vinyl alcohol copolymer have traditionally been used as packaging films or vessels because of their excellence in strength, transparency, gas barrier properties, and chemical resistance. Meanwhile, laminates of a cyclic polyolefin-based polymer and a metal or metal compound such as aluminum foil have very high gas barrier properties and, at the same time, exhibit excellent strength and excellent chemical resistance; and thus have been used as packaging films or vessels for contents extremely vulnerable to oxygen or moisture.

The above laminates have, however, had a problem in that the cyclic olefin-based polymer has poor adhesive properties with the ethylene-vinyl alcohol copolymer and the metal or metal compound such as aluminum foil. In view of this, it has been proposed that a polyolefin-based polymer or an acid modified product thereof is interposed as an adhesive component between the cyclic olefin-based polymer and the ethylene-vinyl alcohol copolymer or the metal or metal compound (for example, Patent Documents 1 and 2). However, those techniques do not provide sufficient adhesive strength; and further improvement of the adhesive strength has been desired.

PRIOR ART DOCUMENT

Patent Document

[Patent Document 1]: Japanese Patent Application Laid-Open Publication No. H11-070624
[Patent Document 2]: Japanese Patent Application Laid-Open Publication No. 2003-191380

SUMMARY OF THE INVENTION

Problems to be Solved by the Invention

An object of the present invention is to provide thermoplastic resin compositions and adhesive coating materials capable of adhering a cyclic polyolefin-based polymer with an ethylene-vinyl alcohol copolymer with sufficient strength.

Further, another object of the present invention is to provide thermoplastic resin compositions and adhesive coating materials capable of adhering a cyclic polyolefin-based polymer with a metal or metal compound such as aluminum foil with sufficient strength.

Further, another object of the present invention is to provide laminates using the above thermoplastic resin composition or adhesive coating material.

Further, another object of the present invention is to provide press through package products using the above laminate and methods for producing the press through package product.

Means for Solving the Problems

The present inventors have intensively studied to find out that particular thermoplastic resin composition or particular adhesive coating materials are able to achieve the above objects.

Accordingly the present invention is a thermoplastic resin composition comprising
 (A) 100 parts by mass of thermoplastic resin;
 (B) 0.05 to 5 parts by mass of one or more kinds selected from the group consisting of an unsaturated carboxylic acid and an unsaturated carboxylic acid derivative; and
 (C) 0.01 to 3 parts by mass of organic peroxide;
 the component (A) comprising
 (a1) 10 to 90% by mass cyclic polyolefin-based polymer; and
 (a2) 90 to 10% by mass a hydrogenated product of a block copolymer comprising a polymer block composed mainly of an aromatic vinyl compound and a random copolymer block of a conjugated diene compound and an aromatic vinyl compound (with the proviso that the total of the component (a1) and the component (a2) is 100% by mass).

The second invention is the thermoplastic resin composition of the first invention in which the component (a1) is a copolymer of a cyclic olefin and an α-olefin having 2 to 8 carbon atoms.

The third invention is a method of producing a thermoplastic resin composition, the method comprising melt kneading a composition comprising
 (A) 100 parts by mass of thermoplastic resin;
 (B) 0.05 to 5 parts by mass of one or more kinds selected from the group consisting of an unsaturated carboxylic acid and an unsaturated carboxylic acid derivative; and
 (C) 0.01 to 3 parts by mass of organic peroxide;
 the component (A) comprising
 (a1) 10 to 90% by mass cyclic polyolefin-based polymer; and
 (a2) 90 to 10% by mass a hydrogenated product of a block copolymer comprising a polymer block composed mainly of an aromatic vinyl compound and a random copolymer block of a conjugated diene compound and an aromatic vinyl compound (with the proviso that the total of the component (a1) and the component (a2) is 100% by mass).

The fourth invention is the method described in the third invention in which the component (a1) is a copolymer of a cyclic olefin and an α-olefin having 2 to 8 carbon atoms.

The fifth invention is an adhesive coating material comprising
 (A) 100 parts by mass of thermoplastic resin;
 (B) 0.05 to 5 parts by mass of one or more kinds selected from the group consisting of an unsaturated carboxylic acid and an unsaturated carboxylic acid derivative;
 (C) 0.01 to 3 parts by mass of organic peroxide; and,
 (D) a solvent;
 the component (A) comprising
 (a1) 10 to 90% by mass cyclic polyolefin-based polymer; and
 (a2) 90 to 10% by mass a hydrogenated product of a block copolymer comprising a polymer block composed mainly of an aromatic vinyl compound and a random copolymer block of a conjugated diene compound and an aromatic vinyl compound (with the proviso that the total of the component (a1) and the component (a2) is 100% by mass).

The sixth invention is the adhesive coating material described in the fifth invention in which the component (a1) is a copolymer of a cyclic olefin and an α-olefin having 2 to 8 carbon atoms.

The seventh invention is a method of producing an adhesive coating material comprising
the step (1) of melt kneading a composition comprising
(A) 100 parts by mass of thermoplastic resin;
(B) 0.05 to 5 parts by mass of one or more kinds selected from the group consisting of an unsaturated carboxylic acid and an unsaturated carboxylic acid derivative; and
(C) 0.01 to 3 parts by mass of organic peroxide;
the component (A) comprising
(a1) 10 to 90% by mass cyclic polyolefin-based polymer; and
(a2) 90 to 10% by mass a hydrogenated product of a block copolymer comprising a polymer block composed mainly of an aromatic vinyl compound and a random copolymer block of a conjugated diene compound and an aromatic vinyl compound (with the proviso that the total of the component (a1) and the component (a2) is 100% by mass);
to produce a thermoplastic resin composition; and
the step (2) of dissolving the above thermoplastic resin composition obtained in the step (1) in (D) a solvent.

The eighth invention is the method of the seventh invention in which the component (a1) is a copolymer of a cyclic olefin and an α-olefin having 2 to 8 carbon atoms.

The ninth invention is a laminate comprising:
a layer comprising a cyclic polyolefin-based polymer;
a layer comprising the thermoplastic resin composition of the first or second invention or a layer comprising the adhesive coating material of the fifth or sixth invention; and
a layer comprising a resin having a polar group; laminated in the order thereof.

The tenth invention is a laminate comprising:
a layer comprising a cyclic polyolefin-based polymer;
a layer comprising the thermoplastic resin composition of the first or second invention;
a layer comprising a resin having a polar group;
a layer comprising the thermoplastic resin composition of the first or second invention; and
a layer comprising a cyclic polyolefin-based polymer; laminated in the order thereof.

The eleventh invention is the laminate of the ninth or tenth invention in which the resin having a polar group is an ethylene-vinyl alcohol copolymer.

The twelfth invention is a laminate comprising:
a layer comprising a cyclic polyolefin-based polymer;
a layer comprising the thermoplastic resin composition of the first or second invention or a layer comprising the adhesive coating material of the fifth or sixth invention; and
a layer comprising a metal or a metal compound; laminated in the order thereof.

The thirteenth invention is a laminate comprising:
a layer comprising a cyclic polyolefin-based polymer;
a layer comprising the thermoplastic resin composition of the first or second invention or a layer comprising the adhesive coating material of the fifth or sixth invention;
a layer comprising a metal or a metal compound;
a layer comprising the thermoplastic resin composition of the first or second invention or a layer comprising the adhesive coating material of the fifth or sixth invention; and
a layer comprising a cyclic polyolefin-based polymer laminated in the order thereof.

The fourteenth invention is the laminate of the twelfth or thirteenth invention in which the layer comprising a metal or a metal compound is a layer comprising aluminum foil.

The fifteenth invention is a method of producing a laminate comprising:
the step of producing an adhesive coating material using the method of the seventh or eighth invention; and
the step (3) of laminating a cyclic polyolefin-based polymer film with a foil comprising a metal or a metal compound using the adhesive coating material obtained in the step.

The sixteenth invention is a press through package product comprising the laminate of any of ninth to fourteenth inventions.

The seventeenth invention is a method of producing a press through package product comprising:
the step of producing a laminate using the method of the fifteenth invention; and
the step (4) of producing a press through package product using the laminate obtained in the step.

Effect of the Invention

The thermoplastic resin composition according to the present invention is able to adhere a cyclic polyolefin-based polymer with a resin having a polar group such as an ethylene-vinyl alcohol copolymer or a metal or metal compound such as aluminum foil with sufficient strength. In addition, the composition has excellent shock resistance and transparency and does not impair the characteristics of the cyclic polyolefin-based polymer or the characteristics of the resin having a polar group such as an ethylene-vinyl alcohol copolymer or the metal or metal compound such as aluminum foil. Because of this, by interposing the thermoplastic resin composition according to the present invention as an adhesive component between the cyclic polyolefin-based polymer and the resin having a polar group or the metal or metal compound, laminates made of both of the above can be obtained with high productivity by a method such as co-extrusion method. Further, the thermoplastic resin composition according to the present invention also exhibits excellent productivity as a composition.

Further, the adhesive coating material according to the present invention is able to adhere with a cyclic polyolefin-based polymer with a resin having a polar group such as an ethylene-vinyl alcohol copolymer or a metal or metal compound such as aluminum foil with sufficient strength. In addition, the adhesive coating material does not impair the characteristics of the cyclic polyolefin-based polymer and the characteristics of the resin having a polar group such as an ethylene-vinyl alcohol copolymer or the metal or metal compound such as aluminum foil. Because of this, by laminating the cyclic polyolefin-based polymer with the resin having a polar group or the metal or metal compound by using the adhesive coating material of the present invention, laminates made of both of the above can be obtained with high productivity. The thus obtained laminate can suitably be used for press through package products. Further, the adhesive coating material according to the present invention has good coating properties and exhibits excellent productivity as a coating material. Furthermore, according to the method of producing the adhesive coating material of the present invention, it is possible to obtain excellent adhesive coating materials, laminates using such a coating material, and press through package products using such a laminate.

DETAILED DESCRIPTION OF THE INVENTION

The thermoplastic resin composition according to the present invention comprises (A) 100 parts by mass of thermoplastic resin; (B) 0.05 to 5 parts by mass of one or more kinds selected from the group consisting of an unsaturated carboxylic acid and an unsaturated carboxylic acid derivative; and (C) 0.01 to 3 parts by mass of organic peroxide. Each of the components composing the thermoplastic resin composition according to the present invention will be described below.

<Thermoplastic Resin Composition>

(A) Thermoplastic Resin

The above component (A) comprises (a1) 10 to 90% by mass cyclic polyolefin-based polymer; and (a2) 90 to 10% by mass a hydrogenated product of a block copolymer comprising a polymer block composed mainly of an aromatic vinyl compound and a random copolymer block of a conjugated diene compound and an aromatic vinyl compound. The above component (A) preferably comprises the above component (a1) 40 to 80% by mass and the above component (a2) 60 to 20% by mass. Here, the above component (a1) and the above component (a2) in total account for 100% by mass.

When the above component (a1) accounts for 10% by mass or more and preferably 40% by mass or more (the above component (a2) accounts for 90% by mass or less and preferably 60% by mass or less), better transparency and better adhesive properties are thereby achieved. When the above component (a1) accounts for 90% by mass or less and preferably 80% by mass or less (the above component (a2) accounts for 10% by mass or more and preferably 20% by mass or more), better shock resistance is thereby achieved.

(a1) Cyclic Polyolefin-Based Polymer

The above component (a1) is a polymer that mainly comprises (usually 50% by mass or more, preferably 70% by mass or more, and more preferably 90% by mass or more) a structural unit derived from a cyclic olefin (a polymerizable compound having a cyclic structure formed with carbon atoms and an ethyleny carbon-carbon double bond in the ring).

Examples of the above cyclic olefin can include cyclobutene, cyclopentene, cyclopentadiene, norbornene(bicyclo[2.2.1]hepta-2-ene), dicyclopentadiene(tricyclo[4.3.0.12,5]deca-3,7-diene), and tetracyclododecene(tetracyclo[4.4.0.12,5.17,10]deca-3-ene), and derivatives thereof.

The above cyclic polyolefin-based polymer can be produced, by a known polymerization method, using one or more kinds of the above cyclic olefins. At that time, one or more kinds of other monomers copolymerizable with the cyclic olefin may be used.

Examples of the other monomers described above include α-olefins such as ethylene, propylene, 1-butene, 1-pentene, 1-hexene, 3-methyl-1-butene, 2-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 1-octene, 1-decene, 1-dodecene, 1-tetradecene, 1-hexadecene, 1-octadecene, and 1-eicosene; and nonconjugated dienes such as 1,4-hexadiene, 4-methyl-1,4-hexadiene, 5-methyl-1,4-hexadiene, and 1,7-octadiene.

As the above component (a1), preferred is a copolymer of a cyclic olefin with an α-olefin having 2 to 8 carbon atoms (for example, ethylene, propylene, 1-butene, 1-pentene, 1-hexene, 1-octene, and the like) from the viewpoint of adhesive properties. More preferred is a copolymer of one or more kinds selected from the group consisting of norbornene and derivatives thereof with an α-olefin having 2 to 8 carbon atoms.

The glass transition temperature of the above component (a1) is preferably 70 to 160° C. and more preferably 75 to 140° C. When the glass transition temperature is 70° C. or more, better thermal resistance is thereby achieved. When the glass transition temperature is 160° C. or less, better productivity as a composition is thereby achieved.

In the present specification, the glass transition temperature refers to the midpoint glass transition temperature that is calculated from a curve of the final temperature increasing step measured by a program in which the temperature is kept at 350° C. for five minutes, cooled to 30° C. at a rate of 10° C./min, kept at 30° C. for three minutes, and increased to 350° C. at a rate of 10° C./min using a Diamond DSC type differential scanning calorimeter from PerkinElmer Japan Co., Ltd. in accordance with JIS K7121-1987.

The melt flow rate (hereinafter, abbreviated as "MFR") of the above component (a1) which is measured at 260° C. and 21.18 N in accordance with JIS K 72104999 is preferably 0.1 to 50 g/10 min and more preferablyl to 20 g/10 min. When MFR is within the above range, better molding processability is thereby achieved.

The light transmittance (ASTM D1003, 2 mm thickness) of the above component (a1) is preferably 85% or more and more preferably 90% or more from the viewpoint of transparency. The higher light transmittance is better.

Examples of commercially available products of the above component (a1) can include "TOPAS 8007 (trade name)", "TOPAS 6013 (trade name)", and "TOPAS 6015 (trade name)" from Polyplastics Co., Ltd., "APEL APL6013T (trade name)" and "APEL APL6015T (trade name)" from Mitsui Chemicals, Inc., "ZEONOR 1020R (trade name)" and "ZEONOR 1060R (trade name)" from Zeon Corporation.

One or more kinds of those can be used as the above component (a1).

(a2) A Hydrogenated Product of a Block Copolymer Comprising a Polymer Block Composed Mainly of an Aromatic Vinyl Compound and a Random Copolymer Block of a Conjugated Diene Compound and an Aromatic Vinyl Compound The above component (a2) is a hydrogenated product of block copolymer comprising at least one, preferably two or more polymer blocks composed mainly of an aromatic vinyl compound P and at least one random copolymer block of a conjugated diene compound and an aromatic vinyl compound Q. Examples can include hydrogenated products of block copolymers having a structure of P-Q, P-Q-P, P-Q-P-Q, P-Q-P-Q-P, and like.

The term a "polymer block composed mainly of an aromatic vinyl compound" as used herein means the content of structural units derived from an aromatic vinyl compound in such a polymer block is usually 90% by mass or more and preferably 95% by mass or more.

The above random copolymer block of a conjugated diene compound and an aromatic vinyl compound preferably comprises 10 to 97% by mass the structural unit derived from a conjugated diene compound and 90 to 3% by mass the structural unit derived from an aromatic vinyl compound. It more preferably comprises 70 to 95% by mass the structural unit derived from a conjugated diene compound and 30 to 5% by mass the structural unit derived from an aromatic vinyl compound. Here, the sum of the content of the structural unit derived from a conjugated diene compound and the content of the structural unit derived from an aromatic vinyl compound is 100% by mass.

The composition distribution of the above polymer block composed mainly of an aromatic vinyl compound is not particularly restricted. The composition distribution of the above random copolymer block of a conjugated diene compound and an aromatic vinyl compound is not particularly restricted.

The above aromatic vinyl compound is a polymerizable monomer having a polymerizable carbon-carbon double bond and an aromatic ring. Examples of the aromatic vinyl compound can include styrene, t-butylstyrene, α-methylstyrene, p-methylstyrene, divinylbenzene, 1,1-diphenylstyrene, N,N-diethyl-p-aminoethyl styrene, vinyltoluene, and p-tertiary butylstyrene. Of these, styrene is preferred. One or more kinds of those can be used as the aromatic vinyl compound.

The above conjugated diene is a polymerizable monomer having a structure with two carbon-carbon double bonds being linked by one carbon-carbon single bond. Examples of the conjugated diene can include 1,3-butadiene, isoprene(2-methyl-1,3-butadiene), 2,3-dimethyl-1,3-butadiene, and chloroprene(2-chloro-1,3-butadiene). Of these, 1,3-butadiene is preferred from the viewpoint of shock resistance. One or more kinds of those can be used as the conjugated diene.

The hydrogenation rate (a percentage of the number of bonds converted to a carbon-carbon single bond by hydrogenation based on the number of carbon-carbon double bonds in a block copolymer before the hydrogenation) of the above component (a2) is preferably 50% by mole or more, more preferably 80% by mole or more, still more preferably 98% by mole or more from the viewpoint of thermal resistance.

The content of the structural unit derived from an aromatic vinyl compound in the above component (a2) is preferably 5 to 75% by mass and more preferably 20 to 70% by mass. When the content is in this range, a composition that is well balanced between transparency and shock resistance is obtained.

The molecular weight of the above component (a2) is not particularly restricted and may be molecular weight corresponding to a melt flow rate of 0.1 to 30 g/10 min from the viewpoint of molding processability, wherein the melt flow rate is measured at 230° C. and 21.18 N in accordance with JIS K 7210-1999.

Examples of commercially available products of the above component (a2) can include "S.O.E. S1605 (trade name)", "S.O.E. S1606 (trade name)", "S.O.E. S1611 (trade name)", and "S.O.E. L609 (trade name)", all of which are from Asahi Kasei Chemicals Corporation.

One or more kinds of those can be used as the above component (a2).

(B) Unsaturated Carboxylic Acid and Unsaturated Carboxylic Acid Derivative

The above component (B) is one or more kinds selected from the group consisting of an unsaturated carboxylic acid and an unsaturated carboxylic acid derivative. The above component (B) undergoes graft polymerization with the above component (A) and functions to render adhesive properties with a resin having a polar group such as an ethylene-vinyl alcohol copolymer (EVOH), nylon, and polyester; a metal such as aluminum, copper, silver, gold, and tin; and a metal compound (an inorganic metal compound) such as an oxide, a nitride, a fluoride, and a sulfide of one or more metals such as aluminum, tin, zinc, indium, germanium, antimony, and cerium to the thermoplastic resin composition according to the present invention.

Examples of the unsaturated carboxylic acid can include maleic acid, itaconic acid, fumaric acid, acrylic acid, and methacrylic acid. Examples of the unsaturated carboxylic acid derivative can include maleate monoester, maleate diester, maleic anhydride, itaconate monoester, itaconate diester, itaconic anhydride, fumarate monoester, fumarate diester, fumaric anhydride, alkyl acrylate such as methyl acrylate, and alkyl methacrylate such as methyl methacrylate. As the above component (B), one kind of those or a mixture of two or more kinds of those can be used.

Maleic anhydride is preferred as the above component (B) from the viewpoint of reactivity with the above component (A) and composition's adhesive properties.

The amount of the above component (B) mixed in the thermoplastic resin is 0.05 to 5 parts by mass based on 100 parts by mass of the above component (A). In light of improving the adhesive properties of the thermoplastic resin of the present invention, the amount is 0.05 parts by mass or more and preferably 0.1 parts by mass or more. In addition, from the viewpoint of preventing poor appearance of articles composed of the composition such as color change (yellowing) or gel from occurring due to unreacted residues of the component (B) in the composition at the time of modification (at the time of graft polymerization), the amount is 5 parts by mass or less and preferably 3 parts by mass or less.

(C) Organic Peroxide

The component (C) of the present invention is an organic peroxide which functions to catalyze a graft polymerization reaction between the above component (A) and the above component (B).

Examples of the organic peroxide can include dicumyl peroxide, di-tert-butyl peroxide, 2,5-dimethyl-2,5-di-(tert-butylperoxy)hexane, 2,5-dimethyl-2,5-di(tert-butylperoxy)hexyne-3,1,3-bis(tert-butylperoxyisopropyl)benzene, 1,1-bis(tert-butylperoxy)-3,3,5-trimethyl cyclohexane, n-butyl-4,4-bis(tert-butylperoxy)valerate, benzoyl peroxide, p-chlorobenzoyl peroxide, 2,4-dichlorobenzoyl peroxide, tert-butyl peroxybenzoate, tert-butylperoxy isopropyl carbonate, diacetyl peroxide, lauroyl peroxide, and tert-butyl cumyl peroxide. As the above component (C), one kind of those or a mixture of two or more kinds of those can be used.

As the above component (C), preferred is 2,5-dimethyl-2,5-di-(tert-butylperoxy)hexane and 2,5-dimethyl-2,5-di-(tert-butylperoxy)hexyne-3 from the viewpoint of composition's manufacturability and adhesive properties.

The amount of the above component (C) mixed is 0.001 to 3 parts by mass based on 100 parts by mass of the above component (A). The amount is 0.001 parts by mass or more and preferably 0.03 parts by mass or more from the viewpoint of improving the adhesive properties of the thermoplastic resin composition of the present invention and preventing a gel from being generated when the film is formed. In addition, the amount is 3 parts by mass or less and preferably 2 parts by mass or less from the viewpoint of preventing and reducing color change (yellowing) and decreased melt viscosity at the time of modification.

Examples of commercially available products of the above component (C) can include "Perhexa 25B (trade name)" and "Perhexane 25B (trade name)" from NOF Corporation.

In the thermoplastic resin composition of the present invention, components other than the above components (A) to (C), for example, thermoplastic resins other than the above component (A); pigments, inorganic fillers, organic fillers, resin fillers; additives such as lubricants, antioxidants, weatherproof stabilizers, heat stabilizers, mold releasing agents, antistatic agents, and surfactants; and the like can, if desired, be further included to the extent of not interfering with the object of the present invention.

<Method of Producing a Thermoplastic Resin Composition>

The thermoplastic resin composition of the present invention can be obtained, without any particular restriction, by a freely-selected method. It can, for example, be obtained by melt kneading the above components (A) to (C) and a freely-selected component that is, if desired, employed by using a freely-selected melt kneader.

The above thermoplastic resin composition can preferably be obtained by melt kneading the above components (A) to (C) and a freely-selected component that is, if desired, employed by using a freely-selected melt kneader preferably at a temperature equal to or higher than the one minute half life temperature of the above component (C) for one minute or more and more preferably at a temperature equal to or higher than the one minute half life temperature of the above component (C) for two minutes or more.

The above melt kneader is not particularly restricted; and examples thereof include a single screw extruder, a twin screw extruder, a Banbury mixer, various kneaders, and apparatus with two or more of these in combination.

The melt mass flow rate of the above thermoplastic resin composition which is measured under the conditions of 230° C. and 21.18 N in accordance with JIS K7210:1999 is preferably 0.5 g/10 min or more from the viewpoint of better manufacturability in the subsequent melt kneading step. In addition, the melt mass flow rate is preferably 15 g/10 min or less from the viewpoint of formability when laminates are formed using the thermoplastic resin composition and composition's adhesive properties.

<Adhesive Coating Material>

The adhesive coating material according to the present invention comprises (D) a solvent in addition to what was described above, namely (A) 100 parts by mass of thermoplastic resin; (B) 0.05 to 5 parts by mass of one or more selected from the group consisting of an unsaturated carboxylic acid and an unsaturated carboxylic acid derivative; and (C) 0.01 to 3 parts by mass of organic peroxide.

As the (A) thermoplastic resin composing the adhesive coating material according to the present invention, resins similar to the above (A) thermoplastic resin can be used. It is to be noted that when the component (a1) accounts for 10% by mass or more and preferably 40% by mass or more (the above component (a2) accounts for 90% by mass or less and preferably 60% by mass or less) in a hydrogenated product of the (a1) cyclic polyolefin-based polymer and the (a2) block copolymer used as the (A) thermoplastic resin, better adhesive properties, better coating properties, and better transparency are thereby achieved. When the component (a1) accounts for 90% by mass or less and preferably 80% by mass or less (the above component (a2) accounts for 10% by mass or more and preferably 20% by mass or more), better productivity of the above step (1) (better productivity of the thermoplastic resin composition comprising the above components (A) to (C)) is thereby achieved. In addition, when the component (a1) that has the glass transition temperature described above is used, better productivity of the adhesive coating material is thereby achieved. Further, when the component (a1) that has MFR described above is used, the productivity of the adhesive coating material improves. Further, when the component (a1) that has light transmittance described above is used, the adhesive coating material of the present invention can suitably be used for applications where transparency is required. The component (A), the component (B), the component (C), and the freely-selected component have been described above and here those descriptions are skipped; and the component (D) will now be described below.

(D) Solvent

The component (D) of the present invention is a solvent. The above component (D) is not particularly restricted as long as it is a solvent capable of dissolving the above component (A) to (C) and preferably the thermoplastic resin composition obtained by melt kneading a composition comprising the above components (A) to (C); and a freely-selected solvent can be used.

Examples of the above component (D) can include toluene, xylene, methyl isobutyl ketone, cyclohexane, tetrahydrofuran, and chloroform. Of these, toluene is preferred from the viewpoint of solubility and storage stability. One or more kinds of those can be used as the above component (D).

The amount of the above component (D) mixed depends on the thickness of a coating film to be formed by using the adhesive coating material of the present invention; and in cases where a common application apparatus is utilized, the amount may be usually 100 to 2000 parts by mass, preferably 300 to 1800 parts by mass, and more preferably 500 to 1500 parts by mass based on 100 parts by mass of the above component (A).

<Method of Producing an Adhesive Coating Material>

The adhesive coating material according to the present invention can be obtained, without any particular restriction, by a freely-selected method. The adhesive coating material according to the present invention can, for example, be obtained by a production method comprising the step (1) of melt kneading the above components (A) to (C) using a freely-selected melt kneader to produce a thermoplastic resin composition; and the step (2) of dissolving the above thermoplastic resin composition obtained in the above-mentioned step (1) in (D) a solvent. As the melt kneader, machines similar to those described above can be used.

In the step of producing the thermoplastic resin composition in the above step (1), the melt kneading is carried out preferably for one or more minutes at a temperature equal to or higher than the one minute half life temperature of the above component (C) and more preferably for two or more minutes at a temperature equal to or higher than the one minute half life temperature of the above component (C).

The melt mass flow rate of the thermoplastic resin composition produced in the above step (1), which melt mass flow rate is measured under the conditions of 230° C. and 21.18 N in accordance with JIS K7210:1999 is not particularly restricted and may be 0.5 g/10 min to 15 g/10 min from the viewpoint of the productivity of the adhesive coating material.

A method of dissolving the above thermoplastic resin composition obtained in the above step (1) in the above (D) a solvent in the above step (2) is not particularly restricted; and the dissolution can be achieved preferably by mixing and stirring for 15 or more minutes at ordinary temperature to 50° C. using a freely-selected mixing and stirring machine.

Further, when the above step (1) or/and the above step (2) is/are carried out, components other than the above components (A) to (D), for example, thermoplastic resins other than the above component (A); pigments, inorganic fillers, organic fillers, resin fillers; additives such as lubricants, antioxidants, weatherproof stabilizers, heat stabilizers, mold releasing agents, antistatic agents, and surfactants; and the like can, if desired, be further included to the extent of not interfering with the object of the present invention.

In the thermoplastic resin composition and the adhesive coating material according to the present invention, a polar group such as a carboxyl group is introduced to a cyclic polyolefin-based nonpolar material; and the thermoplastic resin composition and the adhesive coating material exhibit good adhesive properties with various materials. Examples of the nonpolar material exhibiting good adhesive properties can include polyethylene, polypropylene, poly(1-butene), poly(4-methyl-1-pentene), and cyclic polyolefin. Examples of polar materials can include resins having a polar group such as ethylene-vinyl alcohol copolymer (EVOH), nylon, polyurethane, and polyester; metals such as andiron, aluminum, copper, silver, gold, and tin; metal compounds (inorganic metal compounds) such as oxides, nitrides, fluorides, and sulfides of one or more kind of metals such as aluminum, tin, zinc, indium, germanium, antimony, and cerium. It is particularly surprising that the thermoplastic resin composition and the adhesive coating material exhibit good adhesive properties with both polyolefin and ethylene-vinyl alcohol copolymer having a large number of hydroxyl groups. Because of this, the thermoplastic resin composition and the adhesive coating material of the present invention can suitably be used as an adhesive material.

<Laminate>

Examples of preferred articles using the thermoplastic resin composition or the adhesive coating material according to the present invention can include laminates with at least one layer comprising the thermoplastic resin composition or the adhesive coating material of the present invention.

The thickness of the layer comprising the thermoplastic resin composition or the adhesive coating material according to the present invention is not particularly restricted and may be usually 0.5 μm or more, preferably 1 μm or more, and more preferably 2 μm or more from the viewpoint of adhesive properties. In addition, the thickness may be usually 100 μm or less, preferably 50 μm or less, and more preferably 30 μm or less from the viewpoint of economic efficiency.

Further, the overall thickness of the above laminate is not particularly restricted and may be usually 10 to 1000 μm and preferably 20 to 500 μm from the viewpoint of manufacturability, mechanical strength, and web handling properties of the laminate.

<The First Embodiment of Laminate>

Examples of preferred embodiments of the laminate according to the present invention can include laminates in which a layer comprising a cyclic polyolefin-based polymer, a layer comprising the thermoplastic resin composition or the adhesive coating material of the present invention, and a layer comprising a resin having a polar group are laminated in the order thereof; and laminates in which a layer comprising a cyclic polyolefin-based polymer, a layer comprising the thermoplastic resin composition or the adhesive coating material of the present invention, a layer comprising a resin having a polar group, a layer comprising the thermoplastic resin composition or the adhesive coating material of the present invention, and a layer comprising a cyclic polyolefin-based polymer are laminated in the order thereof.

In the laminate of the above embodiment, each of the layers is preferably directly laminated.

The layer comprising a resin having a polar group in the above laminate is preferably a layer comprising an ethylene-vinyl alcohol copolymer.

A method of producing the laminate of the above embodiment using the thermoplastic resin composition according to the present invention is not particularly restricted; and the production can be carried out using a freely-selected apparatus by a freely-selected method. Examples thereof can include a method comprising melting constituent materials of each layer in a separate extruder and performing T die co-extrusion by a multi manifold method or stack plate method, or a feed block method; a extrusion lamination method comprising forming at least one resin film by a freely-selected method and then performing melt extrusion of other resin layers on the film; and a method comprising forming resin films of each layer by a freely-selected method and then integrating them by thermal lamination.

The laminate of the above embodiment using the thermoplastic resin composition according to the present invention can suitably be employed, as a laminate having high strength, high transparency, high gas barrier properties, chemical resistance, and the like in combination, for packaging films and storage vessels for, for example, food products, medical instruments, and the like.

A method of producing the laminate of the above embodiment using the adhesive coating material according to the present invention is not particularly restricted; and the production can be carried out using a freely-selected apparatus by a freely-selected method. Examples can include a method comprising applying the adhesive coating material according to the present invention on either one of a film comprising a cyclic polyolefin-based polymer or a film comprising a resin having a polar group and then further laminating the other film thereon; and a method comprising applying the adhesive coating material of the present invention on a freely-selected film substrate to form a coating film, transferring the obtained coating film onto either one of a film comprising a cyclic polyolefin-based polymer or a film comprising a resin having a polar group, and then further laminating the other film thereon.

A method of forming a coating film using the adhesive coating material is not particularly restricted; and known methods for web coating can be employed. Specific examples thereof can include methods such as roll coating, gravure coating, reverse coating, roller brush coating, spray coating, air knife coating, and die coating.

The laminate of the above embodiment using the adhesive coating material according to the present invention can suitably be employed, as a laminate having high strength, high transparency, high gas barrier properties, chemical resistance, and the like in combination, for packaging films and storage vessels for, for example, food products, medical instruments, and the like, in particular for press through package (PTP packaging) products.

<The Second Embodiment of Laminate>

Examples of other preferred embodiments of the laminate according to the present invention can include laminates in which a layer comprising a cyclic polyolefin-based polymer, a layer comprising the thermoplastic resin composition or the adhesive coating material of the present invention, and a layer comprising a metal or a metal compound are laminated in the order thereof; and laminates in which a layer comprising a cyclic polyolefin-based polymer, a layer comprising the thermoplastic resin composition or the adhesive coating material of the present invention, a layer comprising a metal or a metal compound, a layer comprising the thermoplastic resin composition or the adhesive coating material of the present invention, and a layer comprising a cyclic polyolefin-based polymer are laminated in the order thereof.

In the laminate of the above embodiment, each of the layers is preferably directly laminated.

The layer comprising a metal or a metal compound in the above laminate is preferably a layer comprising aluminum foil.

A method of producing the laminate of the above embodiment using the thermoplastic resin composition according to the present invention is not particularly restricted; and the production can be carried out using a freely-selected apparatus by a freely-selected method. Examples can include an extrusion lamination method using a foil comprising a metal or a metal compound, the method comprising performing melt extrusion of a laminate having a layer comprising a cyclic polyolefin-based polymer and a layer comprising the thermoplastic resin composition of the present invention on the above foil in such a way that the layer comprising the thermoplastic resin composition of the present invention is on the side of the above foil; and a method comprising preparing a laminate having a layer comprising a cyclic polyolefin-based polymer and a layer comprising the thermoplastic resin composition of the present invention by a freely-selected method and then performing thermal lamination of the above laminate with the above foil in such a way that the layer comprising the thermoplastic resin composition of the present invention is on the side of the above foil.

Examples of the above method can include an extrusion lamination method comprising performing melt extrusion of a laminate having a layer comprising a cyclic polyolefin-based polymer and a layer comprising the thermoplastic resin composition of the present invention on a layer comprising a metal or a metal compound of a laminate in which at least one of the surfaces is a layer comprising a metal or a metal compound in such a way that the layer comprising the thermoplastic resin composition of the present invention is on the side of the above layer comprising a metal or a metal compound; and a method comprising preparing a laminate having a layer comprising a cyclic polyolefin-based polymer and a layer comprising the thermoplastic resin composition of the present invention by a freely-selected method and then performing thermal lamination of the above laminate with a laminate in which at least one of the surfaces is a layer comprising a metal or a metal compound in such a way that the layer comprising the thermoplastic resin composition of the present invention is on the side of the above layer comprising a metal or a metal compound.

Examples of the laminate in which at least one of the surfaces is the above layer comprising a metal or a metal compound can include a laminate obtained by laminating a freely-selected film-shaped substrate with a foil comprising a metal or a metal compound by a method such as dry lamination and thermal lamination; a laminate obtained by subjecting a metal or a metal compound to vapor deposition on a freely-selected film-shaped substrate by a freely-selected method; a laminate obtained by performing melt extrusion of a freely-selected thermoplastic resin on a foil comprising a metal or a metal compound; and a laminate obtained by forming a coating film on a foil comprising a metal or a metal compound using a freely-selected coating agent.

The laminate of the above embodiment using the thermoplastic resin composition according to the present invention can suitably be employed, as a laminate with very high gas barrier properties, for packaging films and storage vessels for contents vulnerable to oxygen or moisture such as food products and medical instruments, and pharmaceutical products.

A method of producing the laminate of the above embodiment using the adhesive coating material according to the present invention is not particularly restricted; and the production can be carried out using a freely-selected apparatus by a freely-selected method. Examples of the above method can include a method comprising applying the adhesive coating material of the present invention on a film comprising a cyclic polyolefin-based polymer and then further laminating a foil comprising a metal or a metal compound thereon; a method comprising applying the adhesive coating material of the present invention on a freely-selected film substrate to form a coating film, transferring the obtained coating film onto a film comprising a cyclic polyolefin-based polymer, and then further laminating a foil comprising a metal or a metal compound thereon; a method comprising applying the adhesive coating material of the present invention on a film comprising a cyclic polyolefin-based polymer and then further laminating a laminate in which at least one of the surfaces is a layer comprising a metal or a metal compound thereon in such a way that the above layer comprising a metal or a metal compound is on the side of the layer comprising the thermoplastic resin composition of the present invention; and a method comprising applying the adhesive coating material of the present invention on a freely-selected film substrate to form a coating film, transferring the obtained coating film onto a film comprising a cyclic polyolefin-based polymer, and then further laminating a laminate in which at least one of the surfaces is a layer comprising a metal or a metal compound thereon in such a way that the above layer comprising a metal or a metal compound is on the side of the layer comprising the thermoplastic resin composition of the present invention. Examples of methods of forming a coating film using the adhesive coating material include methods described above.

The laminate of the above embodiment using the adhesive coating material according to the present invention can suitably be employed, as a laminate with very high gas barrier properties for, for example, packaging films and storage vessel for contents vulnerable to oxygen or moisture such as food products, medical instruments, and pharmaceutical products. It is in particular suitable for press through package (PTP packaging) for individually wrapping medicine tablets, capsules, and the like.

EXAMPLES

Hereinafter, the present invention is described with reference to Examples, but the present invention is not limited thereto.

<Method of Measurement>
(A1) Adhesive Properties
(A1-1) Adhesive Properties to a Cyclic Polyolefin-Based Copolymer (to COC)

A thermoplastic resin composition prepared as described below and a cyclic olefin-based copolymer ("TOPAS 8007F-04 (trade name)" from Polyplastics Co., Ltd.) were extruded using a 40 mm single screw extruder and a 25 mm single screw extruder, respectively, from a two color molding die under the conditions of a die temperature of 240° C. to form a two color molded product with a cyclic polyolefin-based copolymer layer on a thermoplastic resin composition layer, wherein the cyclic polyolefin-based copolymer layer was rectangular in shape and 0.1 mm in thickness and the thermoplastic resin composition layer took a generally rectangular cross-sectional shape when cut vertically to the machine direction and was rectangular in shape and 1 mm in thickness. The two color molded product obtained above was cut from near the center in the width direction into pieces with a width of 15 mm to yield a sample. The sample was, using JIS Z0237:2009 10.4 as a reference, subjected to measurement of the 180-degree peel adhesion force required to remove the cyclic polyolefin-based copolymer layer from the thermoplastic resin composition layer under the conditions of a test speed of 300 mm/min, wherein the thermoplastic resin composition layer was regarded as a test plate and the cyclic polyolefin-based copolymer layer was as an adhesive tape. It is to be noted that in cases where a peel initiation point was not generated due to very high adhesive properties, "»" was written down in the Tables.

(A1-2) Adhesive Properties to an Ethylene-Vinyl Alcohol Copolymer (to EVOH)

A thermoplastic resin composition prepared as described below and an ethylene-vinyl alcohol copolymer ("Eval L-171B (trade name)" from Kuraray Co., Ltd.) were extruded using a 40 mm single screw extruder and a 25 mm single screw extruder, respectively, from a two color molding die under the conditions of a die temperature of 200° C. to form a two color molded product with an ethylene-vinyl alcohol copolymer layer on a thermoplastic resin composition layer, wherein the ethylene-vinyl alcohol layer was rectangular in shape and 0.1 mm in thickness and the thermoplastic resin composition layer took a generally rectangular cross-sectional shape when cut vertically to the machine direction and was rectangular in shape and 1 mm in thickness. The two color molded product obtained above was cut from near the center in the width direction into pieces with a width of 15 mm to yield a sample. The sample was, using JIS Z0237:2009 10.4 as a reference, subjected to measurement of the 180-degree peel adhesion force required to remove the ethylene-vinyl alcohol copolymer layer from the thermoplastic resin composition layer under the conditions of a test speed of 300 mm/min, wherein the thermoplastic resin composition layer was regarded as a test plate and the ethylene-vinyl alcohol copolymer layer was as an adhesive tape.

(A1-3) Adhesive Properties to a Metal or Metal Compound (to Aluminum Foil)

Onto aluminum foil with a thickness of 25 μm (raw aluminum foil from UACJ Corporation), a thermoplastic resin composition prepared as described below was extruded using a 40 mm single screw extruder under the conditions of a die temperature of 200° C. so as to have a thickness of 1 mm to perform lamination. The laminated product obtained above was cut from near the center in the width direction into pieces with a width of 15 mm to yield a sample. The sample was, using JIS Z0237:2009 10.4 as a reference, subjected to measurement of the 180-degree peel adhesion force required to remove the metal foil layer from the thermoplastic resin composition layer under the conditions of a test speed of 300 mm/min, wherein the thermoplastic resin composition layer was regarded as a test plate and the metal foil layer was as an adhesive tape.

(A2) Shock Resistance (Izod Impact Strength)

Izod impact strength (of notched specimens) was measured using an injection sheet with a thickness of ¼ inches as a test specimen in accordance with ASTM D256, which injection sheet had been formed using an injection molding machine with a mold clamping pressure of 125 tons under the conditions of a cylinder temperature of 260 to 280° C. and a mold temperature of 30° C. It is to be noted that the in cases where test specimen was not broken, NB was written down.

(A3) Transparency (Haze)

The haze value was measured in accordance with JIS K7136:2000 for an injection sheet with a thickness of 2 mm that had been formed using "NDH-300A (trade name)" from Nippon Denshoku Industries Co., Ltd. by using an injection molding machine with a mold clamping pressure of 125 tons under the conditions of a cylinder temperature of 260 to 280° C. and a mold temperature of 30° C.

(A4) Pellet Productivity

The thermoplastic resin composition (P) was pelletized by a strand cut method and the resulting pellet was subjected to visual observation and evaluated in accordance with the following criteria.
  o: The shape of pellet is good.
  x: At least any one of the following defects occurs.
    Blocking occurs in the pellets.
    The pellets are not uniform in shape.
    Bleeding of the component is noticed in the pellets.

(B1) Adhesive Properties (B1-1) Adhesive Properties to a Cyclic Polyolefin-Based Copolymer (to COC)

A film with a thickness of 100 μm was formed using a cyclic olefin-based copolymer ("TOPAS 8007F-04 (trade name)" from Polyplastics Co., Ltd.) by using a apparatus equipped with a 40 mmφ single screw extruder and a T die under the conditions of a die outlet resin temperature of 240° C. The film obtained above was cut out to yield two strips with a size of 150 mm in the machine direction of the film and 15 mm in the width direction. The adhesive coating material was applied to one of the strips from one of its ends to 100 mm therefrom in the machine direction by using an applicator so as to be 10 μm in thickness when dried. After dried by using a 1200 W dryer for one minute, the above strip was put together with the other strip to precisely overlap each other and pressed under the conditions of a temperature of 180° C. and a pressure of 50 kg/cm² for two minutes to allow both strips to adhere, thereby obtaining a test specimen. The T peel adhesion force was measurement using the specimen obtained above under the conditions of a test speed of 50 mm/min. Data was processed with JIS Z0237:2009 10.4.1 as a reference. That is, a measurement value for the first 25 mm in length from the start of the measurement was excluded and an averaged adhesion force for subsequent 50 mm in length was used as T peel adhesion force. It is to be noted that in cases where the above cyclic olefin-based copolymer film is deformed or broken due to very high adhesive force, "»" was written down in the Tables.

(B1-2) Adhesive Properties to a Metal or Metal Compound (to Aluminum Foil)

The same procedures were carried out as described above (B1-1) except that aluminum foil with a thickness of 25 μm (raw aluminum foil from UACJ Corporation) was used instead of the above cyclic olefin-based copolymer film.

(B1-3) Adhesive Properties to a Resin Having a Polar Group (to EVOH)

A film with a thickness of 100 μm was formed using an ethylene-vinyl alcohol copolymer (Kuraray Co., Ltd. "EvalL-171B (trade name)") by using a apparatus equipped with a 40 mmφ single screw extruder and a T die under the conditions of a die outlet resin temperature of 200° C. The same procedures were carried out as described above (B1-1) except that the film obtained above was used instead of the above cyclic olefin-based copolymer film.

(B2) Coating Properties

To the above cyclic olefin-based copolymer film, the adhesive coating material was applied using an applicator so as to have a wet thickness of 100 μm; and the resulting wet coating film was subjected to visual observation and evaluated in accordance with the following criteria.

o: The coating film with uniform wet thickness was able to be obtained.

x: The coating film with uniform wet thickness was not able to be obtained.

<Raw Materials Used>

Component (a1)

(a1-1) A cyclic olefin copolymer "TOPAS 8007F-04 (trade name)" from Polyplastics Co., Ltd. having a glass transition temperature of 79° C., an MFR (260° C., 2.16 kg) of 32 g/10 min, and a light transmittance of 91%.

(a1-2) A cyclic olefin copolymer "TOPAS 6013F-04 (trade name)" from Polyplastics Co., Ltd. having a glass transition temperature of 139° C., an MFR (260° C., 2.16 kg) of 14 g/10 min, and a light transmittance of 91%.

(a1-3) A cyclic olefin copolymer "APEL 6013T (trade name)" from Mitsui Chemicals, Inc. having a glass transition temperature of 125° C., an MFR (260° C., 2.16 kg) of 14 g/10 min, and a light transmittance of 90%.

(a1-4) A cycloolefin polymer "ZEONOR 1020R (trade name)" from Zeon Corporation having a glass transition temperature of 102° C., an MFR (280° C., 21.18 N) of 20 g/10 min, and a light transmittance of 92%.

Component (a2)

(a2-1) "S.O.E. S1606 (trade name)" from Asahi Kasei Chemicals Corporation which is a hydrogenated product of block copolymer comprising a polymer block composed mainly of styrene and a random copolymer block composed of 1,3-butadiene and styrene, the hydrogenated product being completely hydrogenated and having a content of structural units derived from styrene of 52% by mass.

(a2-2) "S.O.E. S1605 (trade name)" from Asahi Kasei Chemicals Corporation which is a hydrogenated product of block copolymer comprising a polymer block composed mainly of styrene and a random copolymer block composed of 1,3-butadiene and styrene, the hydrogenated product being completely hydrogenated and having a content of structural units derived from styrene of 67% by mass.

(a2-3) "S.O.E. S1611 (trade name)" from Asahi Kasei Chemicals Corporation which is a hydrogenated product of block copolymer comprising a polymer block composed mainly of styrene and a random copolymer block composed of 1,3-butadiene and styrene, the hydrogenated product being partially hydrogenated and having a content of structural units derived from styrene of 57% by mass.

Reference Component (a2')

(a2'-1) "DYNARON 1320P (trade name)" from JSR Corporation which is a hydrogenated product of random copolymer comprising 1,3-butadiene and styrene, the product having a hydrogenation rate of 99% by mole and a content of structural units derived from styrene of 10% by mass.

(a2'-2) "Septon 2063 (trade name)" from Kuraray Co., Ltd. which is a styrene-ethylene-propylene-styrene block copolymer having a hydrogenation rate of 90% by mole or more and a content of structural units derived from styrene of 30% by mass.

Component (B)

(B-1) Maleic anhydride from Nippon Shokubai Co., Ltd.

Component (C)

(C-1) "Perhexa 25B (trade name)" from NOF Corporation which is 2,5-dimethyl-2,5-di-(t-butylperoxy)hexane having a one minute half life temperature of 180° C.

Examples A1 to A13 and Examples A1S to A8S

A mixture with a composition (parts by mass) shown in any one of Tables 1 to 3 below is fed at one time using a co-rotating twin screw extruder, melt kneaded under the conditions of an extruder outlet resin temperature of 190° C., and pelletized by a strand cut method, thereby obtaining pellets of thermoplastic resin composition (P). The obtained thermoplastic resin composition (P) was subjected to the above evaluation (A1) to (A4). The results of the evaluation are as shown in Tables 1 to 3.

TABLE 1

| | | Example 1S | Example 1 | Example 2 | Example 3 | Example 4 | Example 2S | Example 5 |
|---|---|---|---|---|---|---|---|---|
| Composition (parts by mass) | a1-1 | 7 | 20 | 50 | 70 | 85 | 95 | |
| | a1-2 | | | | | | | 70 |
| | a1-3 | | | | | | | |
| | a1-4 | | | | | | | |
| | a2-1 | 93 | 80 | 50 | 30 | 15 | 5 | 30 |
| | a2-2 | | | | | | | |
| | a2-3 | | | | | | | |
| | a2'-1 | | | | | | | |
| | a2'-2 | | | | | | | |
| | B-1 | 0.2 | 0.2 | 0.2 | 0.2 | 0.2 | 0.2 | 0.2 |
| | C-1 | 0.05 | 0.05 | 0.05 | 0.05 | 0.05 | 0.05 | 0.05 |
| | Adhesive properties [N/15 mm] | | | | | | | |
| Results | 1) to COC | >> | >> | >> | >> | >> | >> | >> |
| | 2) To EVOH | <0.1 | 2 | 7 | 12 | 16 | 17 | 11 |
| | 3) To aluminum foil | <0.1 | 2 | 5 | 7 | 10 | 11 | 8 |
| | Impact strength [J/m] | NB | NB | NB | NB | 37 | 25 | NB |
| | Haze [%] | >40 | 38 | 31 | 20 | 11 | 4 | 16 |
| | Pellet productivity | X | ○ | ○ | ○ | ○ | X | ○ |

TABLE 2

|  |  | Example 6 | Example 7 | Example 8 | Example 9 | Example 3S | Example 4S | Example 5S |
|---|---|---|---|---|---|---|---|---|
| Composition (parts by mass) | a1-1 |  |  | 70 | 70 | 70 | 70 | 70 |
|  | a1-2 |  |  |  |  |  |  |  |
|  | a1-3 | 70 |  |  |  |  |  |  |
|  | a1-4 |  | 70 |  |  |  |  |  |
|  | a2-1 | 30 | 30 |  |  |  |  | 30 |
|  | a2-2 |  |  | 30 |  |  |  |  |
|  | a2-3 |  |  |  | 30 |  |  |  |
|  | a2'-1 |  |  |  |  | 30 |  |  |
|  | a2'-2 |  |  |  |  |  | 30 |  |
|  | B-1 | 0.2 | 0.2 | 0.2 | 0.2 | 0.2 | 0.2 | 0.02 |
|  | C-1 | 0.05 | 0.05 | 0.05 | 0.05 | 0.05 | 0.05 | 0.05 |
|  | Adhesive properties [N/15 mm] |  |  |  |  |  |  |  |
| Results | 1) to COC | >> | >> | >> | >> | >> | >> | >> |
|  | 2) To EVOH | 6 | 2 | 12 | 10 | 11 | 11 | <0.1 |
|  | 3) To aluminum foil | 8 | 3 | 9 | 5 | 6 | 5 | <0.1 |
|  | Impact strength [J/m] | NB | NB | 32 | 30 | NB | 25 | NB |
|  | Haze [%] | 15 | 8 | 27 | 32 | >40 | >40 | 18 |
|  | Pellet productivity | ○ | ○ | ○ | ○ | ○ | ○ | ○ |

TABLE 3

|  |  | Example 10 | Example 11 | Example 6S | Example 7S | Example 12 | Example 13 | Example 8S |
|---|---|---|---|---|---|---|---|---|
| Composition (parts by mass) | a1-1 | 70 | 70 | 70 | 70 | 70 | 70 | 70 |
|  | a1-2 |  |  |  |  |  |  |  |
|  | a1-3 |  |  |  |  |  |  |  |
|  | a1-4 |  |  |  |  |  |  |  |
|  | a2-1 | 30 | 30 | 30 | 30 | 30 | 30 | 30 |
|  | a2-2 |  |  |  |  |  |  |  |
|  | a2-3 |  |  |  |  |  |  |  |
|  | a2'-1 |  |  |  |  |  |  |  |
|  | a2'-2 |  |  |  |  |  |  |  |
|  | B-1 | 0.08 | 4 | 5.5 | 0.2 | 0.2 | 0.2 | 0.2 |
|  | C-1 | 0.05 | 0.05 | 0.05 | 0 | 0.02 | 2.5 | 3.5 |
|  | Adhesive properties [N/15 mm] |  |  |  |  |  |  |  |
| Results | 1) to COC | >> | >> | >> | >> | >> | >> | >> |
|  | 2) To EVOH | 2 | 16 | 17 | <0.1 | 5 | 21 | 22 |
|  | 3) To aluminum foil | 3 | 12 | 13 | <0.1 | 5 | 14 | 15 |
|  | Impact strength [J/m] | NB | NB | NB | NB | NB | NB | NB |
|  | Haze [%] | 18 | 19 | 18 | 18 | 20 | 25 | 29 |
|  | Pellet productivity | ○ | ○ | X | ○ | ○ | ○ | X |

Examples B1 to B13 and Examples B1S to B7S

A mixture with a composition (parts by mass) shown in any one of Tables 4 to 6 below is fed at one time using a co-rotating twin screw extruder, melt kneaded under the conditions of an extruder outlet resin temperature of 190° C., and pelletized by a strand cut method, thereby obtaining pellets of thermoplastic resin composition. In 1000 parts by mass of toluene, 100 parts by mass of the obtained thermoplastic resin composition was dissolved to obtain an adhesive coating material with a solid concentration of 9% by mass. The obtained adhesive coating material and laminate were subjected to the above evaluation (B1) to (B2). The results are shown in any one of Tables 1 to 3.

TABLE 4

|  |  | Example 1S | Example 1 | Example 2 | Example 3 | Example 4 | Example 2S | Example 5 |
|---|---|---|---|---|---|---|---|---|
| Composition (parts by mass) | a1-1 | 7 | 20 | 50 | 70 | 85 | 95 |  |
|  | a1-2 |  |  |  |  |  |  | 70 |
|  | a1-3 |  |  |  |  |  |  |  |
|  | a1-4 |  |  |  |  |  |  |  |
|  | a2-1 | 93 | 80 | 50 | 30 | 15 | 5 | 30 |
|  | a2-2 |  |  |  |  |  |  |  |
|  | a2-3 |  |  |  |  |  |  |  |
|  | a2'-1 |  |  |  |  |  |  |  |
|  | B-1 | 0.2 | 0.2 | 0.2 | 0.2 | 0.2 | 0.2 | 0.2 |
|  | C-1 | 0.05 | 0.05 | 0.05 | 0.05 | 0.05 | 0.05 | 0.05 |

TABLE 4-continued

|  |  | Example 1S | Example 1 | Example 2 | Example 3 | Example 4 | Example 2S | Example 5 |
|---|---|---|---|---|---|---|---|---|
|  | Adhesive properties [N/15 mm] |  |  |  |  |  |  |  |
| Results | 1) to COC | >> | >> | >> | >> | >> | >> | >> |
|  | 2) To aluminum foil | <0.1 | 1.4 | 1.8 | 3.2 | 3.5 | 3.6 | 2.9 |
|  | 3) To EVOH | <0.1 | 1.5 | 1.8 | 2.7 | 3.2 | 4.0 | 2.3 |
|  | Coating properties | X | ○ | ○ | ○ | ○ | ○ | ○ |

TABLE 5

|  |  | Example 6 | Example 7 | Example 8 | Example 9 | Example 3S | Example 4S |
|---|---|---|---|---|---|---|---|
| Composition (parts by mass) | a1-1 |  |  | 70 | 70 | 70 | 70 |
|  | a1-2 |  |  |  |  |  |  |
|  | a1-3 | 70 |  |  |  |  |  |
|  | a1-4 |  | 70 |  |  |  |  |
|  | a2-1 | 30 | 30 |  |  |  | 30 |
|  | a2-2 |  |  | 30 |  |  |  |
|  | a2-3 |  |  |  | 30 |  |  |
|  | a2'-1 |  |  |  |  | 30 |  |
|  | B-1 | 0.2 | 0.2 | 0.2 | 0.2 | 0.2 | 0.02 |
|  | C-1 | 0.05 | 0.05 | 0.05 | 0.05 | 0.05 | 0.05 |
|  | Adhesive properties [N/15 mm] |  |  |  |  |  |  |
| Results | 1) to COC | >> | >> | >> | >> | >> | >> |
|  | 2) To aluminum foil | 2.6 | 2.4 | 3.1 | 2.9 | 2.8 | <0.1 |
|  | 3) To EVOH | 2.5 | 2.3 | 2.8 | 2.1 | 2.2 | <0.1 |
|  | Coating properties | ○ | ○ | 0 | 0 | X | ○ |

TABLE 6

|  |  | Example 10 | Example 11 | Example 5S | Example 6S | Example 12 | Example 131 | Example 7S |
|---|---|---|---|---|---|---|---|---|
| Composition (parts by mass) | a1-1 | 70 | 70 | 70 | 70 | 70 | 70 | 70 |
|  | a1-2 |  |  |  |  |  |  |  |
|  | a1-3 |  |  |  |  |  |  |  |
|  | a1-4 |  |  |  |  |  |  |  |
|  | a2-1 | 30 | 30 | 30 | 30 | 30 | 30 | 30 |
|  | a2-2 |  |  |  |  |  |  |  |
|  | a2-3 |  |  |  |  |  |  |  |
|  | a2'-1 |  |  |  |  |  |  |  |
|  | B-1 | 0.08 | 4 | 5.5 | 0.2 | 0.2 | 0.2 | 0.2 |
|  | C-1 | 0.05 | 0.05 | 0.05 | 0 | 0.02 | 2.5 | 3.5 |
|  | Adhesive properties [N/15 mm] |  |  |  |  |  |  |  |
| Results | 1) to COC | >> | >> | >> | >> | >> | >> | >> |
|  | 2) To aluminum foil | 1.2 | 3.6 | 3.4 | <0.1 | 1.6 | 3.9 | 3.8 |
|  | 3) To EVOH | 0.9 | 4.5 | 5.2 | <0.1 | 1.0 | 2.5 | 2.4 |
|  | Coating properties | ○ | ○ | ○ | ○ | ○ | ○ | ○ |

As is clear from the results of the evaluation in Tables 1 to 6, the thermoplastic resin composition and adhesive coating material according to the present invention exhibit excellence in shock resistance, adhesive properties, transparency, and coating properties. In addition, the productivity as a composition is excellent and the shape of the pellets obtained is good.

The invention claimed is:
1. A thermoplastic resin composition comprising:
(A) 100 parts by mass of thermoplastic resin;
(B) 0.05 to 5 parts by mass of one or more compounds selected from the group consisting of an unsaturated carboxylic acid and an unsaturated carboxylic acid derivative; and
(C) 0.01 to 3 parts by mass of organic peroxide;
the component (A) comprising:
(a1) 10 to 90% by mass a cyclic polyolefin-based polymer; and
(a2) 90 to 10% by mass of a hydrogenated product of a block copolymer comprising a polymer block consisting of an aromatic vinyl compound and a random copolymer block of a conjugated diene compound and an aromatic vinyl compound, provided that the total of the component (a1) and the component (a2) is 100% by mass),
wherein the random copolymer block of the conjugated diene compound and the aromatic vinyl compound consists of 70 to 95% by mass the structural unit derived from the conjugated diene compound and 5 to 30% by mass the structural unit derived from an aromatic vinyl compound, a content of the structural unit derived from the aromatic vinyl compound in the above component (a2) is from more than or equal to 5% mass to and less than 75% by mass, the component (a1) is a copolymer consisting of a cyclic olefin and an α-olefin having 2 to 8 carbon atoms, the cyclic olefin comprises 50% by mass or more of the cyclic polyolefin-based polymer of (a1) and the hydrogenation rate of the hydrogenated product of the block copolymer of (a2) is 50% by mole or more, and a 180-degree peel adhesion force of the thermoplastic resin composition is equal to or more than 0.1 N/15 mm and equal to or less than 21 N/15 mm measured as follows: the thermoplastic resin composition and an ethylene-vinyl alcohol copolymer comprising 27 mol % vinyl alcohol are extruded using a 40 mm single screw extruder and a 25 mm single screw extruder, respectively, from a coextrusion die under the conditions of a die temperature of 200° C. to form an ethylene-vinyl alcohol copolymer layer and a thermoplastic resin composition layer, respectively, in a coextruded molded product, wherein the ethylene-vinyl alcohol layer is 0.1 mm in thickness and the thermoplastic resin composition layer is 1 mm in thickness in rectangular cross-sectional shapes respectively when cut vertically to the machine direction; wherein the coextruded molded product obtained is cut in the width direction into pieces with a width of 15 mm to yield a sample; wherein, using JIS Z0237:2009 10.4, the sample is subjected to measurement of the 180-degree peel adhesion force required to remove the ethylene-vinyl alcohol copolymer layer from the thermoplastic resin composition layer under the conditions of a test speed of 300 mm/min.

2. The thermoplastic resin composition according to claim 1, wherein the cyclic olefin comprises at least one selected from the group consisting of cyclobutene, cyclopentene, cyclopentadiene, norbornene, dicyclopentadiene, tetracyclododecene, and derivatives thereof.

3. A method of producing a thermoplastic resin composition, the method comprising melt kneading the thermoplastic resin composition according to claim 1.

4. A laminate comprising in order:
a layer comprising a cyclic polyolefin-based polymer;
a layer comprising the thermoplastic resin composition according to claim 1; and
a layer comprising a resin having a polar group.

5. A laminate comprising, in order:
a first layer comprising a cyclic polyolefin-based polymer;
a second layer comprising the thermoplastic resin composition according to claim 1;
a third layer comprising a resin having a polar group;
a fourth layer comprising the thermoplastic resin composition according to claim 1; and
a fifth layer comprising the cyclic polyolefin-based polymer laminated in the order thereof.

6. The laminate according to claim 4, wherein the resin having a polar group is an ethylene-vinyl alcohol copolymer.

7. A laminate comprising, in order:
a layer comprising a cyclic polyolefin-based polymer;
a layer comprising the thermoplastic resin composition according to claim 1; and
a layer comprising a metal or a metal compound.

8. A laminate comprising, in order:
a first layer comprising a cyclic polyolefin-based polymer;
a second layer comprising the thermoplastic resin composition according to claim 1;
a third layer comprising a metal or a metal compound;
a fourth layer comprising the thermoplastic resin composition according to claim 1; and
a fifth layer comprising the cyclic polyolefin-based polymer.

9. The laminate according to claim 7, wherein the layer comprising the metal or metal compound is a layer comprising aluminum foil.

10. A press through package product comprising the laminate according to claim 4.

11. An adhesive coating material comprising:
(A) 100 parts by mass of thermoplastic resin;
(B) 0.05 to 5 parts by mass of one or more compounds selected from the group consisting of an unsaturated carboxylic acid and an unsaturated carboxylic acid derivative;
(C) 0.01 to 3 parts by mass of organic peroxide; and
(D) a solvent;
the component (A) comprising:
(a1) 10 to 90% by mass a cyclic polyolefin-based polymer; and
(a2) 90 to 10% by mass a hydrogenated product of a block copolymer comprising a polymer block consisting of an aromatic vinyl compound and a random copolymer block of a conjugated diene compound and an aromatic vinyl compound, provided that the total of the component (a1) and the component (a2) is 100% by mass), wherein the random copolymer block of the conjugated diene compound and the aromatic vinyl compound consists of 70 to 95% by mass the structural unit derived from the conjugated diene compound and 5 to 30% by mass the structural unit derived from an aromatic vinyl compound, a content of the structural unit derived from the aromatic vinyl compound in the above component (a2) is from more than or equal to 30% mass to and less than 75% by mass, the component (a1) is a copolymer consisting of a cyclic olefin and an α-olefin having 2 to 8 carbon atoms, the cyclic olefin comprises 50% by mass or more of the cyclic polyolefin-based polymer of (a1) and the hydrogenation rate of the hydrogenated product of the block copolymer of (a2) is 50% by mole or more, and a T peel adhesion force of the adhesive coating material is equal to or more than 0.1 N/15 mm and equal to or less than 3.9 N/15 mm measured as follows: a film with a thickness of 100 μm is formed using a cyclic olefin-based copolymer formed from polymerizing ethylene and norborene using a metallocene catalyst by using an apparatus equipped with a 40 mmΦ single screw extruder and a T die using a die outlet resin temperature of 240° C. wherein the film cut to yield a first strip and a second strip each with a size of 150 mm in the machine direction of the film and 15 mm in the width direction; wherein the adhesive coating material is applied to the first strip from one of its ends to 100 mm therefrom in the machine direction by using an applicator so as to be 10 μm in thickness when dried; wherein the first strip is dried by using a 1200 W dryer for one minute, wherein the first strip is put together with the second strip to overlap each other without misalignment and are pressed under a temperature of 180° C. and a pressure of 50 kg/cm2 for two minutes to allow both strips to adhere, thereby obtaining a test specimen, wherein the T peel adhesion force is measured using the test specimen under the conditions of a test speed of 50 mm/min, wherein JIS Z0237:2009 10.4.1 is used.

12. A method of producing the adhesive coating material according to claim 11, comprising:
step (1) of melt kneading a composition comprising:
(A) 100 parts by mass of the thermoplastic resin;
(B) 0.05 to 5 parts by mass of the one or more compound selected from the group consisting of an unsaturated carboxylic acid and an unsaturated carboxylic acid derivative; and
(C) 0.01 to 3 parts by mass of the organic peroxide to produce a thermoplastic resin composition; and
step (2) of dissolving the thermoplastic resin composition obtained in the step (1) in (D) a solvent.

13. A method of producing a laminate comprising:
producing an adhesive coating material using the method according to claim 12; and
laminating a cyclic polyolefin-based polymer film with a foil comprising a metal or a metal compound using the adhesive coating material obtained in the step.

14. A method of producing a press through package product comprising:
producing a laminate using the method according to claim 13; and
of producing a press through package product using the laminate.

15. A thermoplastic resin composition comprising:
(A) 100 parts by mass of thermoplastic resin;
(B) 0.05 to 5 parts by mass of one or more compounds selected from the group consisting of an unsaturated carboxylic acid and an unsaturated carboxylic acid derivative; and
(C) 0.01 to 3 parts by mass of organic peroxide;
the component (A) comprising:
(a1) 10 to 90% by mass a cyclic polyolefin-based polymer; and
(a2) 90 to 10% by mass a hydrogenated product of a block copolymer comprising a polymer block consisting of an aromatic vinyl compound and a random copolymer block of a conjugated diene compound and an aromatic vinyl compound, provided that the total of the component (a1) and the component (a2) is 100% by mass,
wherein the random copolymer block of the conjugated diene compound and the aromatic vinyl compound consists of 70 to 95% by mass the structural unit derived from the conjugated diene compound and 5 to 30% by mass the structural unit derived from an aromatic vinyl compound,
a content of the structural unit derived from the aromatic vinyl compound in the above component (a2) is from more than or equal to 5% mass to and less than 75% by mass,
the component (a1) is a copolymer consisting of a cyclic olefin and an α-olefin having 2 to 8 carbon atoms, the cyclic olefin comprises 50% by mass or more of the cyclic polyolefin-based polymer of (a1) and the hydrogenation rate of the hydrogenated product of the block copolymer of (a2) is 50% by mole or more, and
a 180-degree peel adhesion force of the thermoplastic resin composition is equal to or more than 0.1 N/15 mm and equal to or less than 14 N/15 mm measured as follows: onto aluminum foil with a thickness of 25 μm the thermoplastic resin composition is extruded using a 40 mm single screw extruder using a die temperature of 200° C. to form a thermoplastic resin composition layer, wherein the thermoplastic resin has a thickness of 1 mm to obtain a laminated product; wherein the laminated product obtained is cut in the width direction into pieces with a width of 15 mm to yield a sample; wherein, using JIS Z0237:2009 10.4, the sample is subjected to measurement of the 180-degree peel adhesion force required to remove the aluminum foil from the thermoplastic resin composition layer under the conditions of a test speed of 300 mm/min.

16. An adhesive coating material comprising:
(A) 100 parts by mass of thermoplastic resin,
(B) 0.05 to 5 parts by mass of one or more compounds selected from the group consisting of an unsaturated carboxylic acid and an unsaturated carboxylic acid derivative;
(C) 0.01 to 3 parts by mass of organic peroxide; and
(D) a solvent
the component (A) comprising:
(a1) 10 to 90% by mass a cyclic polyolefin-based polymer; and
(a2) 90 to 10% by mass a hydrogenated product of a block copolymer comprising a polymer block consisting of an aromatic vinyl compound and a random copolymer block of a conjugated diene compound and an aromatic vinyl compound, provided that the total of the component (a1) and the component (a2) is 100% by mass,
wherein the random copolymer block of the conjugated diene compound and the aromatic vinyl compound consists of 70 to 95% by mass the structural unit derived from the conjugated diene compound and 5 to 30% by mass the structural unit derived from an aromatic vinyl compound,
a content of the structural unit derived from the aromatic vinyl compound in the above component (a2) is from more than or equal to 30% mass to and less than 75% by mass,
the component (a1) is a copolymer consisting of a cyclic olefin and an α-olefin having 2 to 8 carbon atoms,
the cyclic olefin comprises 50% by mass or more of the cyclic polyolefin-based polymer of (a1) and the hydrogenation rate of the hydrogenated product of the block copolymer of (a2) is 50% by mole or more, and
a T peel adhesion force of the adhesive coating material is equal to or more than 0.1 N/15 mm and equal to or less than 2.5 N/15 mm measured as follows: a film with a thickness of 100 μm is formed using an ethylene-vinyl alcohol copolymer comprising 27 mol % vinyl alcohol, by using an apparatus equipped with a 40 mm(1) single screw extruder and a T die using a die outlet resin temperature of 200° C.; wherein the film is cut to yield a first strip and a second strip each with a size of 150 mm in the machine direction of the film and 15 mm in the width direction; wherein the adhesive coating material is applied to the first strip from one of its ends to 100 mm therefrom in the machine direction by using an applicator so as to be 10 μm in thickness when dried; wherein the first strip is dried by using a 1200 W dryer for one minute, wherein the first strip is put together with the second strip to overlap each other without misalignment and are pressed under a temperature of 180° C. and a pressure of 50 kg/cm2 for two minutes to allow both strips to adhere, thereby obtaining a test specimen; wherein the T peel adhesion force was measured using the test specimen under the conditions of a test speed of 50 mm/min, wherein JIS Z0237:2009 10.4.1 is used.

* * * * *